March 10, 1942.  J. W. TAYLOR  2,276,118
FILTER APPARATUS
Filed May 10, 1939  2 Sheets-Sheet 2
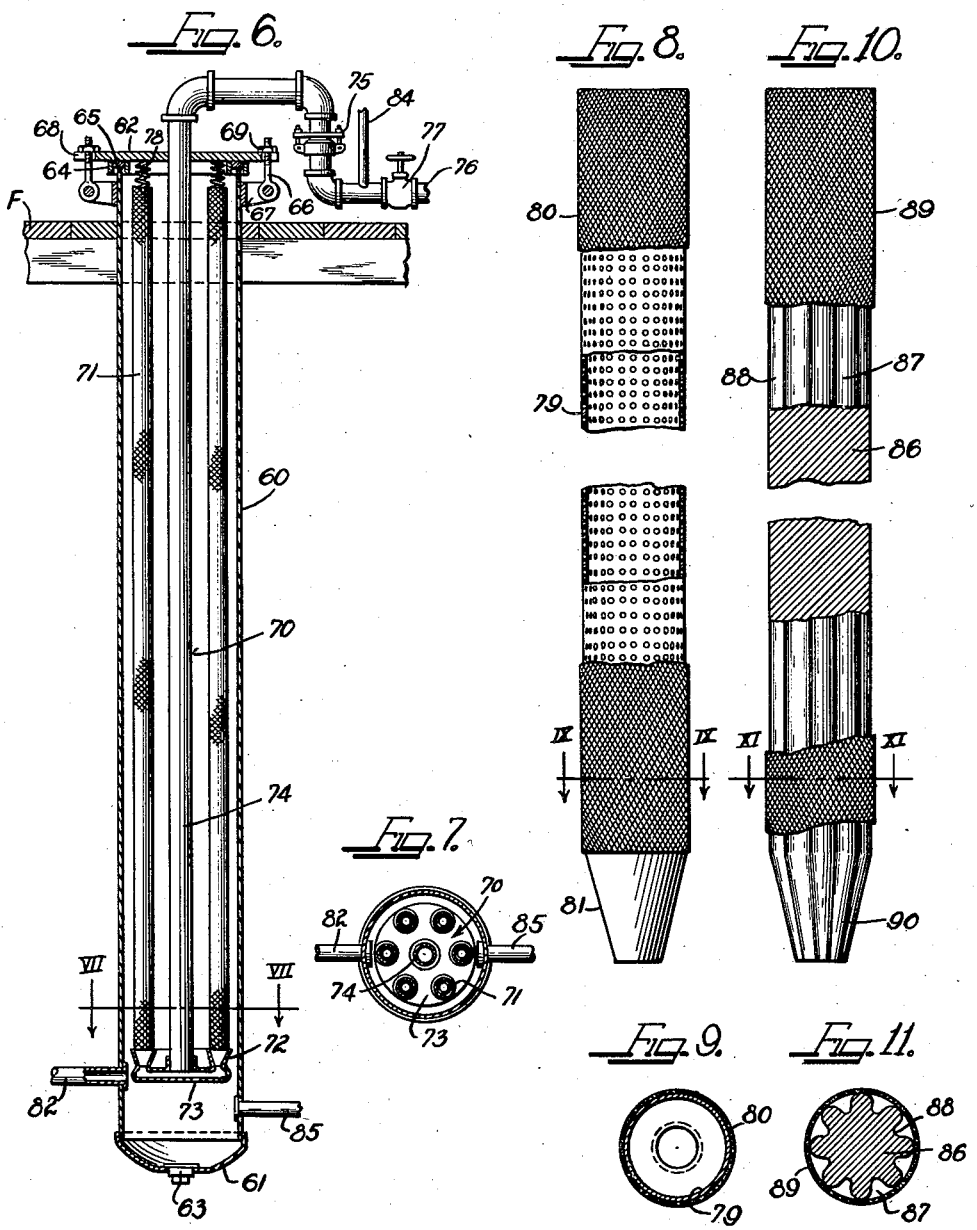
Inventor
JAMES W. TAYLOR Patented Mar. 10, 1942

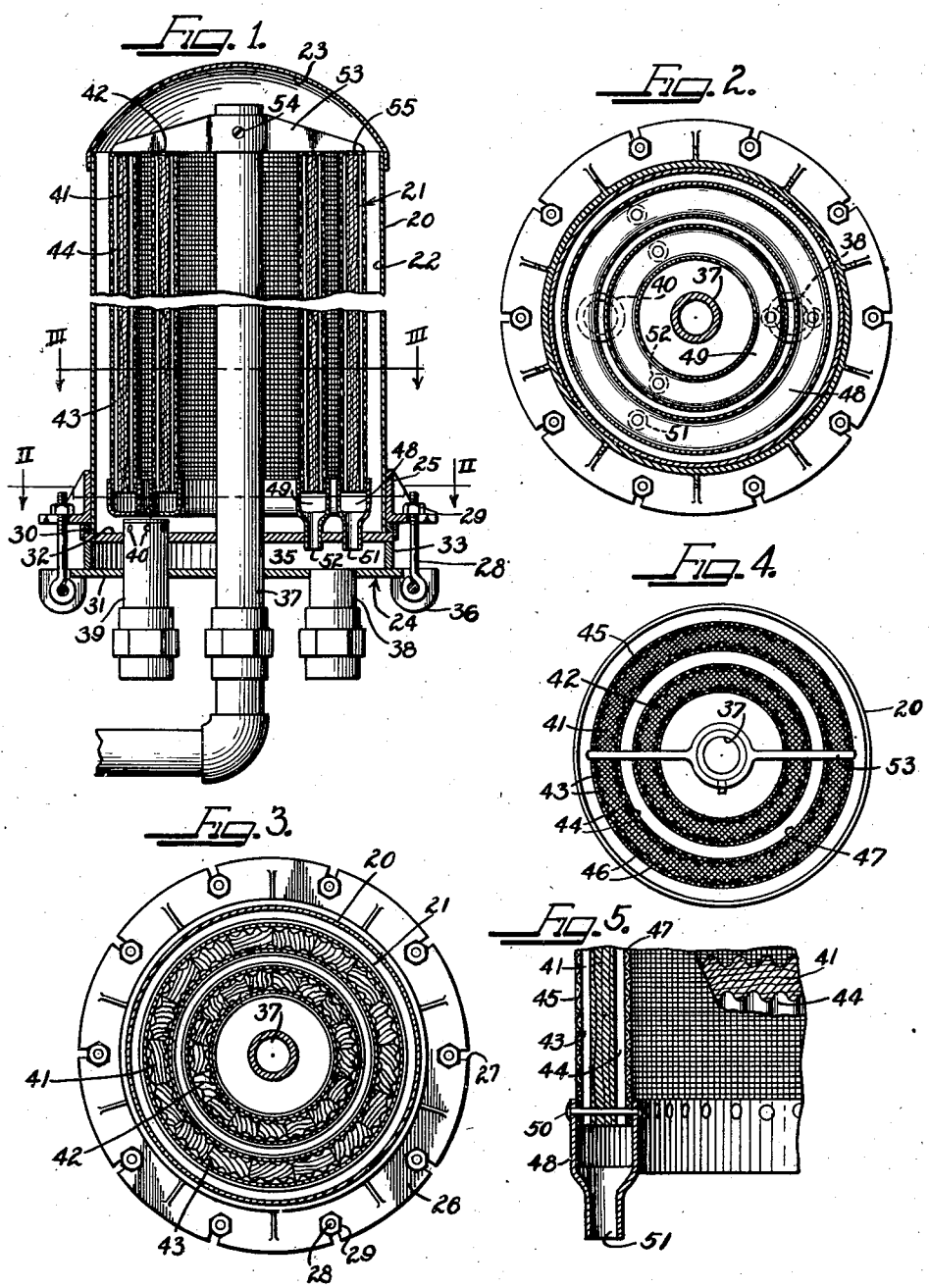

2,276,118

UNITED STATES PATENT OFFICE 2,276,118

FILTER APPARATUS

James W. Taylor, Pensacola, Fla., assignor to Peninsular-Lurton Company, Pensacola, Fla., a corporation of Florida Application May 10, 1939, Serial No. 272,746

6 Claims. (Cl. 210—183)

This invention relates to filter apparatus and more particularly to cylindrical filtering elements having extended filtering surfaces.

In the filtration of crude oleoresins or other material of similar nature I have found it advantageous to employ vertically disposed cylindrical filter units, since they provide an extensive filtering surface that may readily be cleaned or freed from foreign particles that filter out upon it. Preferably I employ a number of such units, together with a common header, into which the lower ends of the filter units are fitted for the collection of the filtrate therein. In their preferred form, the cylindrical filtering elements are provided with longitudinally extending grooves that lie under the filtering medium and provide channels for the passage of the filtrate downwardly into a collecting header or the like.

It is therefore an important object of this invention to provide an improved construction of filter having an extended filtering surface to give a large filtering capacity encompassed within a relatively small volume.

It is a further important object of this invention to provide a vertical, cylindrical type of filtering element having longitudinally extending grooves underlying the filtering medium and forming channels for the gravity flow of filtrate into a lower collecting header, or the like.

It is a further important object of this invention to provide a cylindrical filter shell having a filtering medium on both its inner and outer faces and formed with longitudinally extending filtrate conducting channels beneath such surfaces, thereby providing a filter of large capacity and one that is easy to clean.

Other and further important objects of this invention will be apparent from the disclosures in the specification and the accompanying drawings.

This invention (in a preferred form) is illustrated in the drawings and hereinafter more fully described.

On the drawings:

Figure 1 is a broken vertical sectional view of a filter unit embodying the principles of this invention, with parts thereof in elevation.

Figure 2 is a sectional view taken substantially along the line II—II of Fig. 1.

Figure 3 is a sectional view taken substantially along the line III—III of Fig. 1.

Figure 4 is a top plan view of the filter unit, with the closure member removed.

Figure 5 is a fragmentary enlarged detail view showing the lower construction of the filter unit.

Figure 6 is a vertical sectional view of a modified form of filter unit, with parts in elevation.

Figure 7 is a sectional view taken substantially along the line VII—VII of Fig. 6.

Figure 8 is a broken elevational view of a filtering element such as shown in Fig. 6, with parts broken away and in section.

Figure 9 is a sectional view taken substantially along the line IX—IX of Fig. 8.

Figure 10 is a broken elevational view of a modified form of filter element, with parts broken away and in section.

Figure 11 is a sectional view taken substantially along the line XI—XI of Fig. 10.

As shown on the drawings:

The reference numeral 20 (Figs. 1 to 5 inclusive) indicates generally a cylindrical container or housing for a filter unit 21. Said container 20 comprises a cylindrical shell 22 having welded or otherwise secured thereto an upper closure 23, which may be an outwardly convex head or cap. Said shell 22 is adapted to be closed at its lower end by a removable head, designated generally by the reference numeral 24. Said lower end of the shell 22 has secured thereto an annular collar 25 provided with a peripheral flange 26 that is radially slotted, as at 27, to receive the ends of swinging bolts 28 carried by said head 24. Nuts 29 on the ends of said bolts 28 serve to clamp the head 24 against the lower end of said shell 22, a gasket 30 being interposed to effect a seal therebetween.

The head 24 comprises an outer plate 31 and an inner plate 32 spaced therefrom and secured thereto by a ring 33, thereby forming a chamber 35. The swinging bolts 28 are carried by ears or lugs 36 either secured to or integrally formed on the lower plate 31. An inlet pipe 37 extends upwardly through the center of the head 24 to terminate in spaced relation with the upper closure 23. An outlet pipe 38 is secured in the outer plate 31 of said head 24 for the removal of filtrate therefrom, while a second pipe 39 extends completely through the head 24 and terminates in an apertured end 40 for the withdrawal of unfiltered material from the interior of said container 20.

The filter unit 21 comprises a plurality of cylindrical shells 41 and 42, which may suitably be formed of longitudinally extending wooden strips secured together along their abutting edges. Since each of said shells 41 and 42 is of similar construction, differing only in diameter, but one need be described. The shell 41 is provided with longitudinally extending grooves 43 and 44 on its outer and inner surfaces, respectively. Filter material, such as a wire mesh, textile fabric or the like, completely encloses the shell 41 to provide an outer membrane 45 lying against the longitudinal ridges or crests 46 between the grooves 43 and an inner membrane 47 covering the inner side of said shell 41.

The lower edges of the outer and inner filter units are secured in outer and inner annular troughs 48 and 49, respectively, as by means of headed pins or rivets 50 (Fig. 5). The longitudinally extending grooves 43 and 44 open at their lower ends directly into said collecting troughs 48 and 49, from which a plurality of symmetrically arranged discharge nipples 51 and 52 conduct the filtrate into the chamber 35 of the header 24.

To the upper end of the delivery pipe 37 is secured a winged retaining member 53 by means of a set screw 54. Said retaining member 53 overlies the top of the filter shells 41 and 42 to hold them in fixed spaced relation. In order to prevent unfiltered material from entering the tops of the grooves 43 and 44, said grooves do not extend to the very top edge of said shells 41 and 42 but terminate somewhat short thereof to provide upper closures as at 55 for said grooves.

In operation, the liquid suspension that is to be filtered is introduced into the filter unit through the inlet pipe 37 and flows out of the upper open end thereof over the filter unit 21. Due to the pressure differential between the outside and inside of the filter unit, as caused either by an impressed hydraulic pressure on the liquid to be filtered or by the static head of the liquid itself within the container 20, filtration takes place through the filter mediums 45 and 47. The filtrate flows by gravity along the longitudinal grooves 43 and 44 into the collecting troughs 48 and 49, and thence through the discharge nipples 51 and 52 into the collecting chamber 35. From the collecting chamber 35, the filtrate is run out through the discharge pipe 38.

The non-filtrable residue collects upon the surfaces of the inner and outer filter mediums 47 and 45, respectively, from which the residue can be blown off by passing steam back up through the discharge pipe 38. The residue can then be removed through the pipe 39. If further cleaning is necessary, or if the filter units are to be replaced or repaired, the nuts 29 may be removed and the swinging bolts 28 swung out of their slots 27, to permit relative separation of the shell 22 from the header 24 to expose the filter unit 21.

In the modified form of filter shown in Figs. 6 to 9 inclusive, there is provided an elongated cylindrical shell 60 having a lower dished cap 61 welded or otherwise secured thereto, and an upper removable closure plate 62. The lower cap carries a drain plug 63, through which any unfiltrable residue may be removed.

In order to facilitate the removal of the upper head 62, the shell 60 is secured in place with its upper extended end projecting above a floor level F. The closure plate 62 is provided on its underside with an annular channel 64, at the bottom of which is positioned a gasket 65. The upper end of the shell 60 carries a plurality of swing bolts 66 mounted from radially extending ears 67 secured thereto, and the closure plate 62 is provided with radially extending slots 68 into which said swing bolts extend. Nuts 69 are threaded on the ends of said swing bolts 66 to clamp said closure plate 62 against the upper end of the shell 60, the gasket 65 effecting a tight seal therefor.

The filter unit proper, designated generally by the reference numeral 70, comprises a plurality of relatively small diameter cylindrical tubes 71, the lower ends of which fit into funnel-shaped members 72 in a header 73. Said header 73 is secured centrally to the lower end of an outlet pipe 74, which extends substantially the full length of said shell 60 and passes upwardly through the closure plate 62 for connection through a union 75 with a discharge pipe 76, having a valve 77 positioned therein. The upper ends of the cylindrical filter tubes 71 are held in position by means of coiled springs 78 bearing against the under surface of the closure plate 62.

In the form of filter tube shown in Figs. 8 and 9, the tube comprises a perforated cylinder 79 wrapped around with a wire mesh, textile fabric or other suitable filtering medium 80. The lower end of the tube 79 is tapered as at 81 to fit into one of the flared mouths 72 of the header 73. As will be readily understood, the upper end of the tube 79 is closed, while the lower tapered end 81 is open for the discharge of filtrate into said header 73.

In operation, a liquid suspension to be filtered is introduced through an inlet pipe 82 opening into the shell 60 near the bottom thereof. As the liquid suspension rises within the shell 60, the pressure head under which the liquid suspension is introduced into said shell causes a pressure differential between the outside and inside of the filter tube 71, with the result that liquid filters through the filtering medium 80 into the interior of the perforated pipe 79 and flows downwardly into the header 73, from which it is forced under pressure upwardly through the pipe 74 and out through the open valve 77 into the discharge line 76.

After all of liquid suspension has been filtered, or whenever it is necessary to clean the filter unit, the drain plug 63 may be removed and steam introduced through a pipe 84 (with the valve 77 closed). The steam so introduced flows downwardly through the pipe 74 and up through the filter units 71 and outwardly through the perforations in the tubes 79, thereby causing the residue adhering on the filtering medium 80 to be blown off. Such residue drops down into the bottom of the shell 60 and may be removed through the open drain in the head 61.

If it is desired, during the filtering operation, to heat up the liquid suspension, steam may be introduced through a supplemental pipe 85 that opens into the shell 60 near the bottom thereof.

For complete removal of the filtering unit 70 from the shell 60, the upper closure plate 62 is released by loosening the nuts 69 and swinging the swing bolts 66 out of their grooves 68. The union 75 is then disconnected and the closure plate 62, together with the pipe 74 and attached header 73 lifted out of the shell 60. The filter tubes 71 may easily be removed by lifting them out of the mouths 72 against the compression of the springs 78.

In the modified form of filter unit illustrated in Fig. 10, the unit comprises a solid core 86 having a fluted outer surface 87 providing grooves 88 for the flow of filtrate therealong. A filter medium 89 is wrapped about the core 86 for the full length thereof. The lower end of the core 86 is tapered, as at 90, and continuations of the grooves formed therein to permit the filtrate to flow therealong into the header 73.

This application is a continuation-in-part of my copending application Serial No. 208,083, filed May 14, 1938.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A filter apparatus comprising a casing having a closed top and an open bottom, a head having a top wall for closing said open bottom of the casing, a bottom wall spaced below the top wall and a side wall between the top and bottom walls cooperating therewith to provide a filtrate-receiving chamber, inner and outer annular troughs supported by the top wall of the head, discharge nipples connecting the interiors of the troughs with the filtrate-receiving chamber of the head, inner and outer upstanding annular filter elements in the casing terminating below the closed top of the casing and having the lower ends thereof seated in said troughs, an inlet pipe extending through said head into the casing and terminating above the filter elements but below the top of the casing, means secured to the upper end of the inlet pipe engaging the tops of the filter elements to hold the same in fixed relation to the head, a sludge outlet for said casing, a filtrate outlet for said head, and means detachably connecting said head and said casing whereby the casing is removable from the head and filter elements without disturbing the fixed relationship of the filter elements and head.

2. Filter apparatus comprising a container having an inlet and an outlet, cylindrical filter elements therein, a common header for the lower ends of said elements to receive filtrate therefrom, a pipe in fixed relation to the header, and means carried by the pipe retaining the upper ends of said elements in position relative to said header for removal therewith as a unit.

3. Filter apparatus comprising a container having a closed top and an open bottom, a head closing said open bottom, said head having a filtrate-receiving chamber therein, a plurality of concentric annular open-topped troughs carried by said head above said chamber in communication with the chamber, an annular filter unit seated in each trough and adapted to extend in the container into spaced relation from the closed top thereof, each of said filter units having vertically grooved inner and outer faces covered with a filter media to define a plurality of filtrate passages discharging into said troughs, a feed pipe extending through said head into spaced relation from the domed top of the container, a retaining member carried by the upper end of said feed pipe engaging the tops of said filter units for holding the same in upright position in said container, a drain outlet for said head chamber, a drain outlet for said container and means detachably connecting said head with said container whereby said container can be bodily removed from said head and said filter units without disassembly of the filter units from the head.

4. A device for filtering molten solids and the like to remove entrained solid particles therefrom which comprises an elongated casing, means for introducing molten liquid into the bottom portion of the casing, a cap for sealing the top of the casing, a down pipe extending through said cap into spaced relation from the bottom of the casing, a manifold secured on the bottom end of the down pipe, said manifold having a plurality of tube receiving members around the periphery thereof, filter tubes in said casing seated in said receiving means of the manifold and resilient means interposed between the cap and the top of the tubes for holding the tubes in position whereby said downpipe carries the manifold and filter tubes as a unit removable through the top of the casing.

5. A filtering unit for removing entrained solids from liquids which comprises an elongated cylindrical casing having a closed bottom and an open top, a cap member for closing said open top, means for clamping the cap member on the casing, a down pipe extending through said cap member into spaced relation from the bottom of the casing, a circular manifold supported on the bottom end of the down pipe, said manifold having a plurality of upwardly opening mouths, tubular filter units seated at their lower ends in said mouths, rigidifying means in said filter units providing passageways for filtered liquids and springs interposed between the tops of the rigidifying means and the cap member for holding the filtering units in position on the manifold whereby said downpipe carries the manifold and filter tubes in the casing as a removable unit.

6. Filter apparatus comprising a container, a pipe projecting into said container, a header structure in engagement with said pipe defining a filtrate chamber and having filter unit receiving sockets communicating with the filtrate chamber, a plurality of filter units in the container disposed around the pipe in spaced relation therefrom and from each other, said filter units having their lower ends seated in said sockets, retainer means in engagement with said pipe and bearing against the top ends of the filter units to hold the units in operative relation to said header structure, said pipe, header structure, retainer means and filter units forming an assembly, means detachably connecting the container and assembly, and inlet and outlet means including said pipe to supply material to be filtered to the container and to remove filtrate from the filtrate chamber.

JAMES W. TAYLOR.